Figure 1:
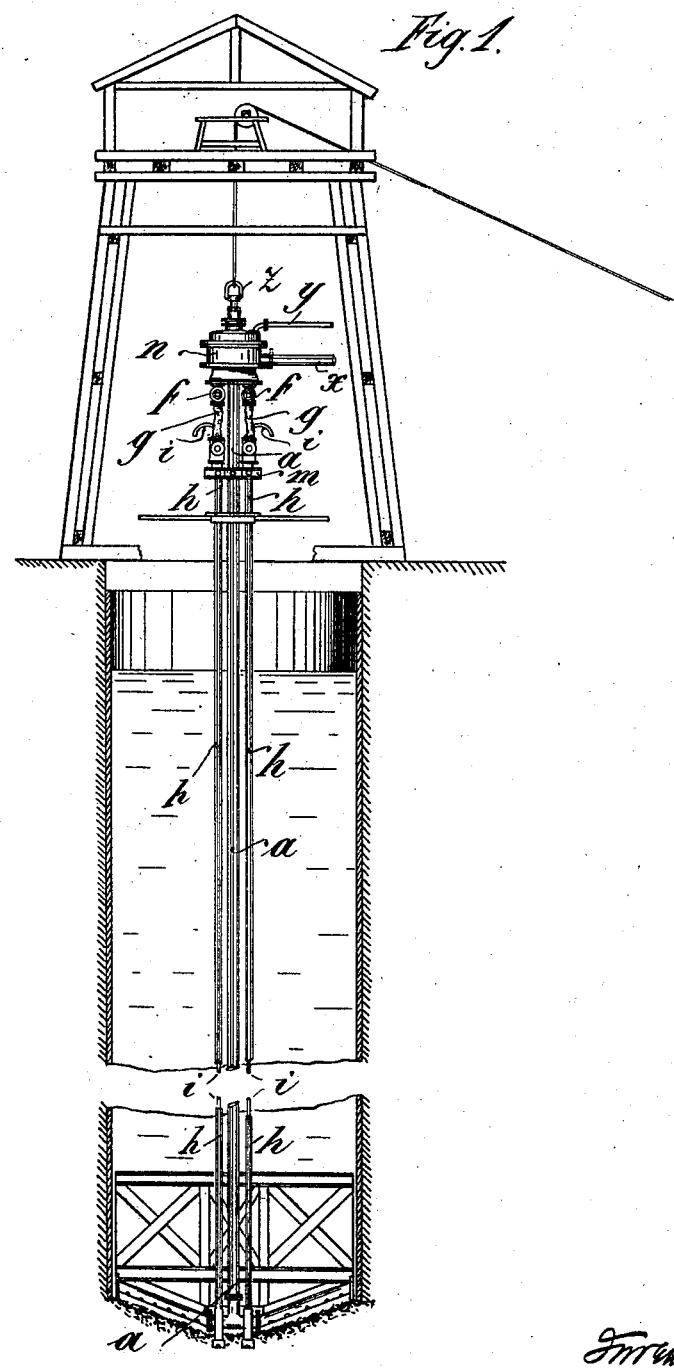

No. 722,764. PATENTED MAR. 17, 1903.
T. STEEN.
PIPE COUPLING FOR DEEP BORING DEVICES.
APPLICATION FILED JUNE 26, 1902.
NO MODEL. 2 SHEETS—SHEET 1.

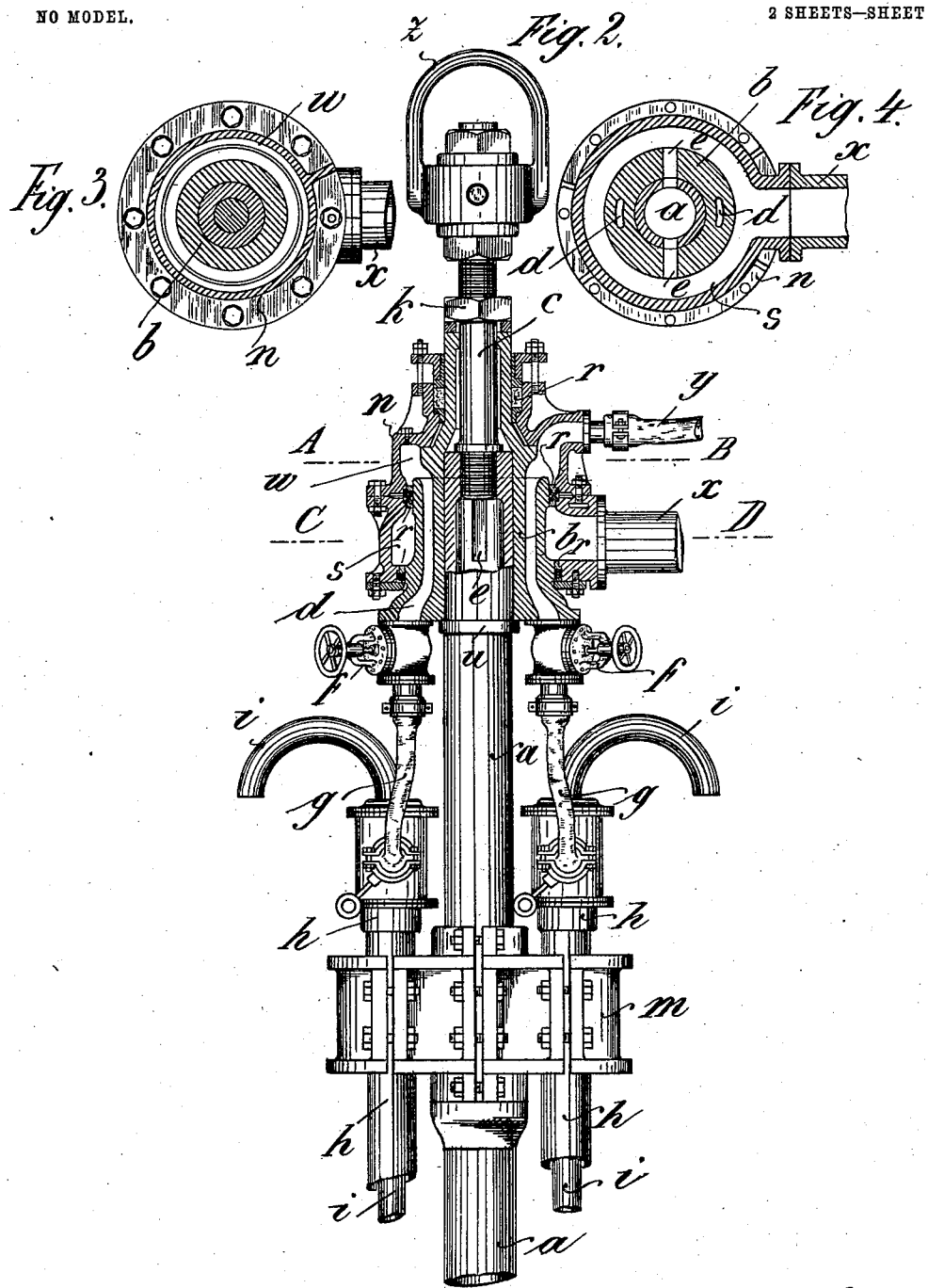

UNITED STATES PATENT OFFICE.

THEODOR STEEN, OF BERLIN, GERMANY, ASSIGNOR TO A. BORSIG, OF TEGEL, NEAR BERLIN, GERMANY.

PIPE-COUPLING FOR DEEP-BORING DEVICES.

SPECIFICATION forming part of Letters Patent No. 722,764, dated March 17, 1903.

Application filed June 26, 1902. Serial No. 113,336. (No model.)

*To all whom it may concern:*

Be it known that I, THEODOR STEEN, engineer, a citizen of the German Empire, and a resident of the city of Berlin, Germany, have invented certain new and useful Improvements in Pipe-Couplings for Deep-Boring Apparatus, of which the following is a specification.

The subject-matter of the present invention relates to a pipe-coupling for deep-boring apparatus in which the standards carry flushing-water pipes and conveying or lifting apparatus for the slime. This pipe-coupling has for its object to connect, on the one hand, the flushing-water pipe with the appropriate supply-pipe and, on the other hand, the air-pipe of the conveying apparatus with the compressed-air passage.

Another object is to permit the conveying or lifting apparatus and the flushing-water pipe to be turned relatively to the water-supply and the compressed-air supply.

One embodiment of the invention is shown in the accompanying drawings by way of example, and in said drawings—

Figure 1 shows an entire view of the deep-boring apparatus. Fig. 2 shows in elevation, on an enlarged scale, only the upper portion thereof with the pipe-coupling in longitudinal section. Fig. 3 is a cross-section of Fig. 2, taken on the line A B. Fig. 4 is a cross-section taken on the line C D.

The flushing-water pipe $a$ serves as the standard for the apparatus and branches on its lower end in a well-known manner, as shown in Fig. 1. On its upper end the pipe $a$ is closed, and the bolt $c$, provided with a suspending-eye $z$ or with a hook, may be screwed into or otherwise connected with the end of the pipe. Furthermore, the head or box $b$ is placed over the end of the pipe and rests upon the shoulder $u$ of the said pipe $a$ and is secured thereon through the medium of the nut $k$, screwed upon the bolt $c$.

As will be seen from Figs. 2 and 4, the box $b$ is provided with two longitudinal channels $d$ and with one or more transverse channels $e$, which latter extend through the wall of the pipe $a$.

At the lower end of the channels $d$ is connected a flexible pipe or hose $g$, provided with a valve $f$ and connected to the air-pipe $h$ of the lifting device for the slime. In the pipe $h$ is arranged in a well-known manner a conveyer lifting-pipe $i$.

It is obvious that the conveyer or lifting-pipe $i$ and the air-pipe $h$ can be arranged adjacent to one another instead of one within the other, and, further, that one or more (two) lifting devices $h$ $i$ might be employed without departing from the essence of the invention. The lifting devices are connected with the flushing-water pipe through a pipe-clamp $m$ or the like. On the head $b$ a housing $n$ is fitted, and which by the packings $r$ bearing against the box $b$ forms between the box and the housing two chambers $s$ and $w$. The chamber $s$ forms a communication between the supply-pipe $x$ and the flushing-water pipe $a$ through the channel $e$, while the chamber $w$ forms a communication between the compressed air $y$ and the pipes $g$ through the channel $d$, so that the flushing-water during the turning of the boring apparatus or while the housing $n$ stands still may flow from $x$ to $a$ and the compressed air in the pipes from $y$ to $g$—that is to say, one can without interrupting the introduction of flushing-water or air-pressure continually operate the boring apparatus, turning it about its axis and simultaneously moving it up and down. Obviously one in this manner could connect the flushing-water pipe with the channel $d$ and the compressed-air pipe with the channel $e$, so that the flushing-water pipe will be fed from the chamber $w$ and the compressed-air pipe of the lifting devices by the chamber $s$.

Having thus described my invention, the following is what I claim as new therein and desire to secure by Letters Patent:

1. A coupling for the flushing-pipe and the lifting device of a boring apparatus formed with two chambers therein, one of which connects with the flushing-pipe supply, and the other of which connects with the lifting-device supply.

2. In a device of the class described, the combination with the flushing-pipe, and the lifting device, of a coupling formed with two channels therein, one of which connects with the flushing-pipe and the other of which connects with the lifting device.

3. In a device of the class described, the combination with the flushing-pipe, the lifting device, and a supply for each of them, of a coupling composed of two parts, movable relatively to, but having communication with each other, one of which connects with the flushing-pipe and the lifting device, and the other of which connects with the flushing-pipe supply and the lifting-device supply.

4. In a device of the class described, the combination with the flushing-pipe, a lifting device and a supply for each of them, of a coupling composed of two parts movable relatively to each other, one of which is supported upon the flushing-pipe and is formed with a longitudinal channel which connects with the lifting device and a transverse channel which connects with the flushing-pipe; and the other of which is formed with two chambers which form communications between the flushing-pipe supply and the transverse channel, and the lifting-device supply and the longitudinal channel.

5. The combination with the pipe $a$ having a shoulder $u$, and the flexible pipe $g$, of a head $b$ placed over the end of the pipe $a$, supported upon the shoulder $u$, and formed with a transverse channel which communicates with the pipe $a$ and a longitudinal channel which communicates with the pipe $g$, a bar $n$ fitted upon the head $b$ and adapted to rotate thereon, forming therewith two chambers, one of which forms a communication between the transverse channel and a supply-pipe, and the other of which forms a communication between the longitudinal channel and another supply-pipe, substantially as described.

In testimony that I claim the foregoing as my invention I have signed my name in presence of two subscribing witnesses.

THEODOR STEEN.

Witnesses:
WOLDEMAR HAUPT,
HENRY HASPER.